US009326568B2

(12) United States Patent
Hung et al.

(10) Patent No.: US 9,326,568 B2
(45) Date of Patent: May 3, 2016

(54) METHOD AND MACHINE FOR AUTOMATICALLY FABRICATING ZIPPERS

(71) Applicant: Able Investments Limited, Kwun Tong (HK)

(72) Inventors: Wan-Hoi Gilbert Hung, Kwun Tong (HK); Ching-Lung Lee, Kwun Tong (HK); Wing-Fai Kong, Kwun Tong (HK)

(73) Assignee: ABLE INVESTMENTS LIMITED, Kwun Tong (HK)

( * ) Notice: Subject to any disclaimer, the term of this patent is extended or adjusted under 35 U.S.C. 154(b) by 248 days.

(21) Appl. No.: 13/867,484

(22) Filed: Apr. 22, 2013

(65) Prior Publication Data

US 2013/0291359 A1 Nov. 7, 2013

(30) Foreign Application Priority Data

May 2, 2012 (TW) .............................. 101115685 A

(51) Int. Cl.
*A44B 19/52* (2006.01)
*A44B 19/46* (2006.01)
*B29D 5/02* (2006.01)
(52) U.S. Cl.
CPC ................ *A44B 19/52* (2013.01); *A44B 19/46* (2013.01); *B29D 5/02* (2013.01); *Y10T 29/49785* (2015.01); *Y10T 29/5101* (2015.01)

(58) Field of Classification Search
CPC .. A44B 19/46; A44B 19/52; Y10T 29/49785; Y10T 29/5101
See application file for complete search history.

(56) References Cited

U.S. PATENT DOCUMENTS 2,768,922 A * 10/1956 Klein ................... A41H 37/003
156/238
2006/0179648 A1* 8/2006 Sawada .................. A44B 19/60
29/768

* cited by examiner

*Primary Examiner* — Moshe Wilensky
(74) *Attorney, Agent, or Firm* — Muncy, Geissler, Olds & Lowe, P.C.

(57) ABSTRACT

The present invention discloses a method and machine for automatically fabricating zippers. The method comprises steps: parallel placing two tapes on the machine, injection-molding a plurality of plastic teeth on two opposite edges of the tapes, leaving untoothed blank regions on the tapes periodically, and applying plastic films onto the tapes; transporting the filmed tapes to a punching device to punch a positioning hole on each blank region; inserting each section of the plastic teeth, which is between two adjacent blank regions, into at least one slider, and using the positioning holes as reference points to injection-mold a plurality of bayonets on the blank regions respectively, wherein each positioning hole corresponds to a set of bayonets; and cutting off the tapes at the blank regions to obtain a plurality of zippers.

9 Claims, 6 Drawing Sheets

METHOD AND MACHINE FOR AUTOMATICALLY FABRICATING ZIPPERS

BACKGROUND OF THE INVENTION

1. Field of the Invention

The present invention relates to a zipper technology, particularly to a method and machine for automatically fabricating zippers.

2. Description of the Related Art

In the conventional zipper technology, the teeth are fabricated in an injection molding method and then set on the edges of tapes to form zippers. Refer to FIG. 1 for a zipper fabricated with an injection molding method in the conventional technology. Each of two tapes 10 has a plurality of teeth 12. The teeth 12 are set on the edges of the tapes 10. The teeth 12 of two tapes 10 are arranged to interdigitate. A slider 14 is used to mesh together or separate the teeth 12 on two tapes 10. Top stops 16 and bottom stops 18 are respectively formed on two ends of a zipper. While a zipper is applied to an overcoat, the top stops 16 and the bottom stops 18 are respectively at the upper end and the lower end of the zipper, preventing the slider 14 from running out of the zipper. Generally, the bottom stops 18 are fabricated to engage with each other.

The current zipper technology uses an injection molding method to form the teeth 12, the top stops 16 and the bottom stops 18 on two long tapes, and then cut off the long tapes at the position where the top stops 16 are located and the position where the bottom stops 18 are located to obtain two toothed tapes having the desired length. Next, the toothed tapes are inserted into the slider 14 manually. As the insertion process is done by manual work, it is manpower- and time-consuming.

Accordingly, the present invention proposes a method and machine for automatically fabricating zippers to overcome the abovementioned problems.

SUMMARY OF THE INVENTION

The primary objective of the present invention is to provide a method and machine for automatically fabricating zippers, wherein a machine is designed to undertake all steps of zipper fabrication, and wherein the conventional zipper fabrication technology is improved to reduce the manpower cost and promote the yield.

Another objective of the present invention is to provide a method and machine for automatically fabricating zippers, wherein a plurality of sections of plastic teeth is formed on two parallel tapes, and wherein the tapes are filmed, perforated and inserted into sliders, and wherein upper and lower bayonets are injection-molded on the tapes, and wherein the tapes are cut off to obtain a plurality of zippers, wherefore the present invention does not insert a plurality of cut tapes into sliders one by one but inserts the uncut tapes into all slides once for all, whereby the present invention can save the time spent in inserting many pieces of cut tapes into sliders one by one.

To achieve the abovementioned objectives, the present invention proposes a method for automatically fabricating zippers, which comprises steps: parallel placing two tapes on a machine for automatically fabricating zippers, injection-molding a plurality of plastic teeth on two opposite edges of the tapes, leaving untoothed blank regions on the tapes periodically, and applying plastic films onto the tapes; transporting the filmed tapes to a punching device to punch a positioning hole on each blank region; inserting each section of the plastic teeth, which is between two adjacent blank regions, into at least one slider, and using the positioning holes as reference points to injection-mold a plurality of bayonets on the blank regions respectively, wherein each positioning hole corresponds to a set of bayonets; and cutting off the tapes at the blank regions to obtain a plurality of zippers.

The present invention also proposes a machine for automatically fabricating zippers, which comprises a tooth sizing device injection-molding a plurality of plastic teeth respectively on two opposite edges of two tapes, which are parallel placed on the tooth sizing device, and leaving untoothed blank regions periodically on the tapes; a plastic film applying device respectively applying plastic films onto the tapes; a punching device punching a positioning hole on each blank region of the tapes; a tape inserting device inserting the tapes into at least one slider; a bayonet injection-molding device injection-molding a plurality of bayonets on the blank regions, wherein each positioning hole corresponds to a set of bayonets; and an automatic cutting device cutting off the tapes at the blank regions to obtain a plurality of zippers.

Below, embodiments are described in detail to make easily understood the objectives, technical contents, characteristics and accomplishments of the present invention.

DETAILED DESCRIPTION OF THE INVENTION

The present invention improves the conventional zipper fabrication process and proposes a method and machine for automatically fabricating zippers, wherein the conventional zipper fabrication procedures are simplified, and wherein a machine is designed to automatically undertake all the simplified zipper fabrication procedures, whereby zippers can be fabricated more easily and faster, and whereby the yield is promoted.

Figure 1:
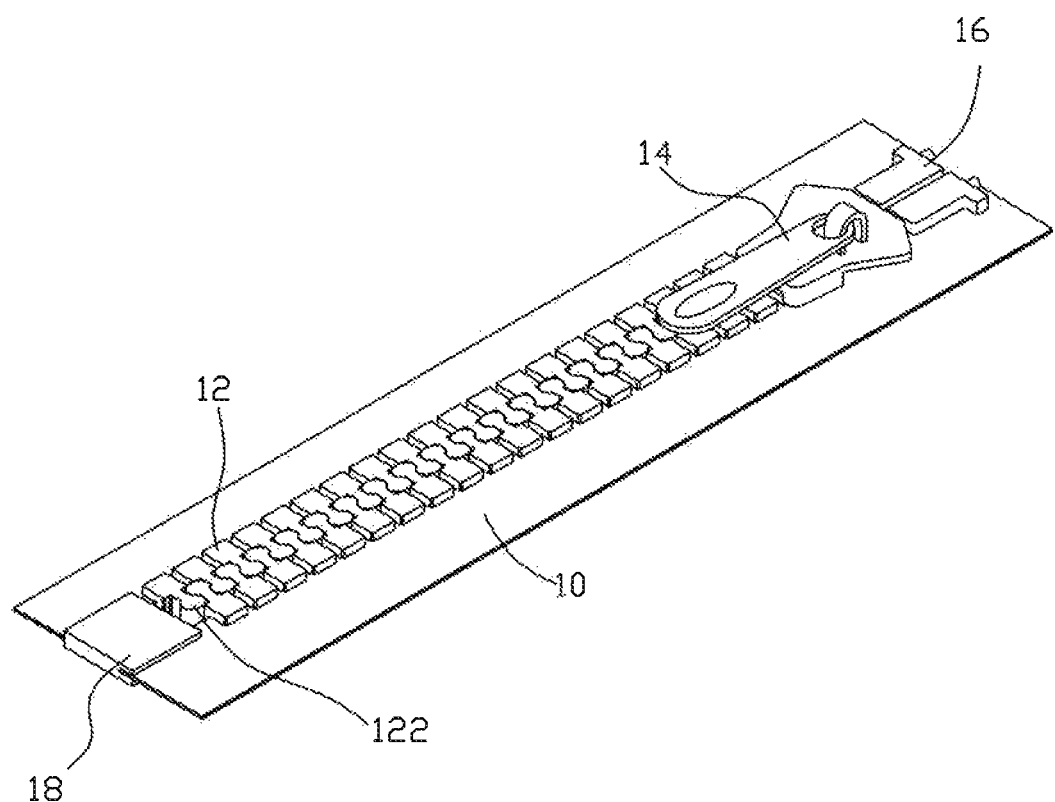
FIG. 1 schematically shows a zipper fabricated with an injection molding method in the conventional technology.
Figure 2:
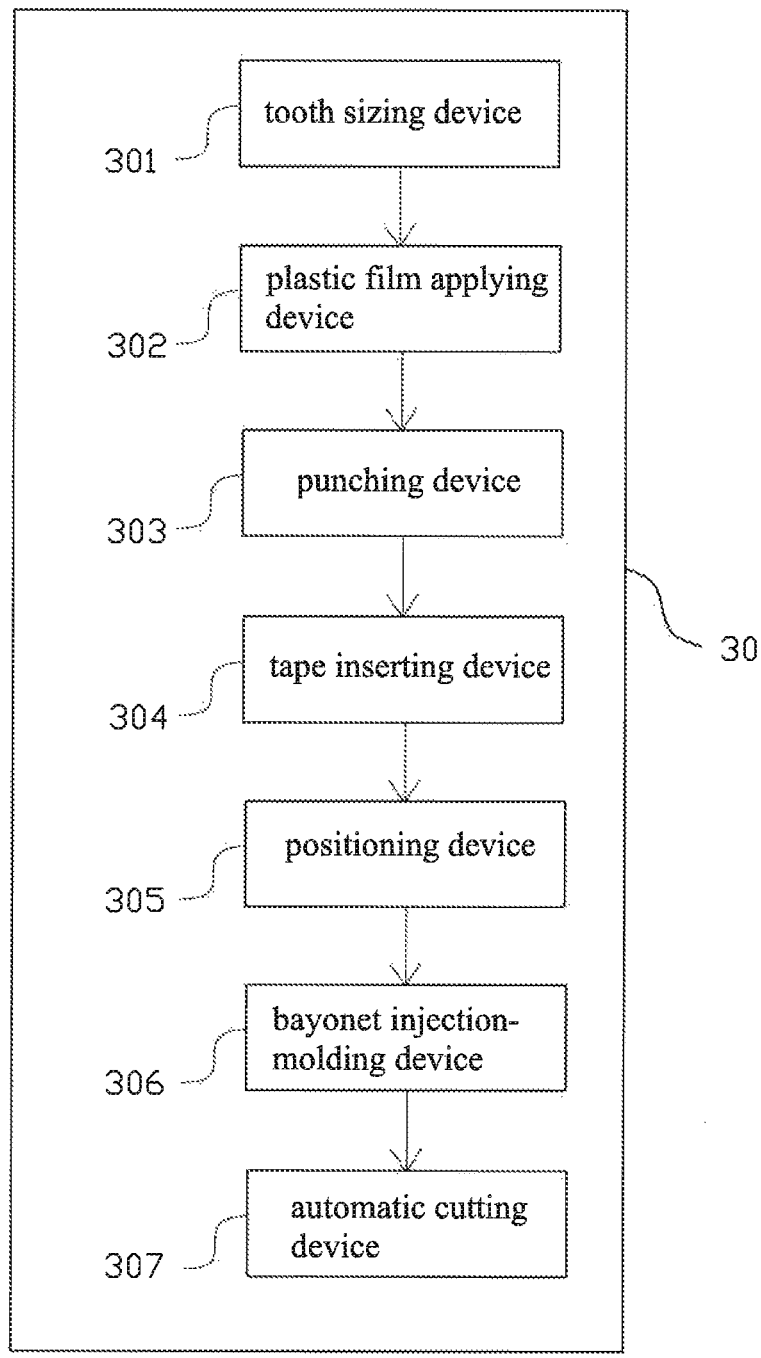
FIG. 2 is a block diagram schematically showing a machine for automatically fabricating zippers according to one embodiment of the present invention.

Refer to FIG. 2 a block diagram schematically showing a machine for automatically fabricating zippers according to one embodiment of the present invention. The machine 30 of the present invention comprises a tooth sizing device 301, a plastic film applying device 302, a punching device 303, a tape inserting device 304, a positioning device 305, a bayonet injection-molding device 306, and an automatic cutting device 307. The size and dimensions of plastic teeth are determined in the tooth sizing device 301. Two tapes are parallel placed in the tooth sizing device 301. The tooth sizing device 301 injection-molds a plurality of plastic teeth respectively on two opposite edges of two tapes to form two rows of plastic teeth, and leaves untoothed blank regions periodically on the tapes. The plastic film applying device 302 applies plastic films onto the tapes to increase the durability of zippers. The punching device 303 punches a positioning hole on each blank region of the filmed tapes to facilitate inserting sliders and injection-molding bayonets. The tape inserting device 304 simultaneously inserts two tapes into a slider, and the positioning device 305 moves the slider to a specified position. The bayonet injection-molding device 306 injection-molds bayonets at the blank regions. Each positioning hole corresponds to a set of bayonets, including an upper stop bayonet and a lower stop bayonet. The automatic cutting device 307 cuts off the tapes at the blank regions to obtain a plurality of zippers.

Figure 3A:
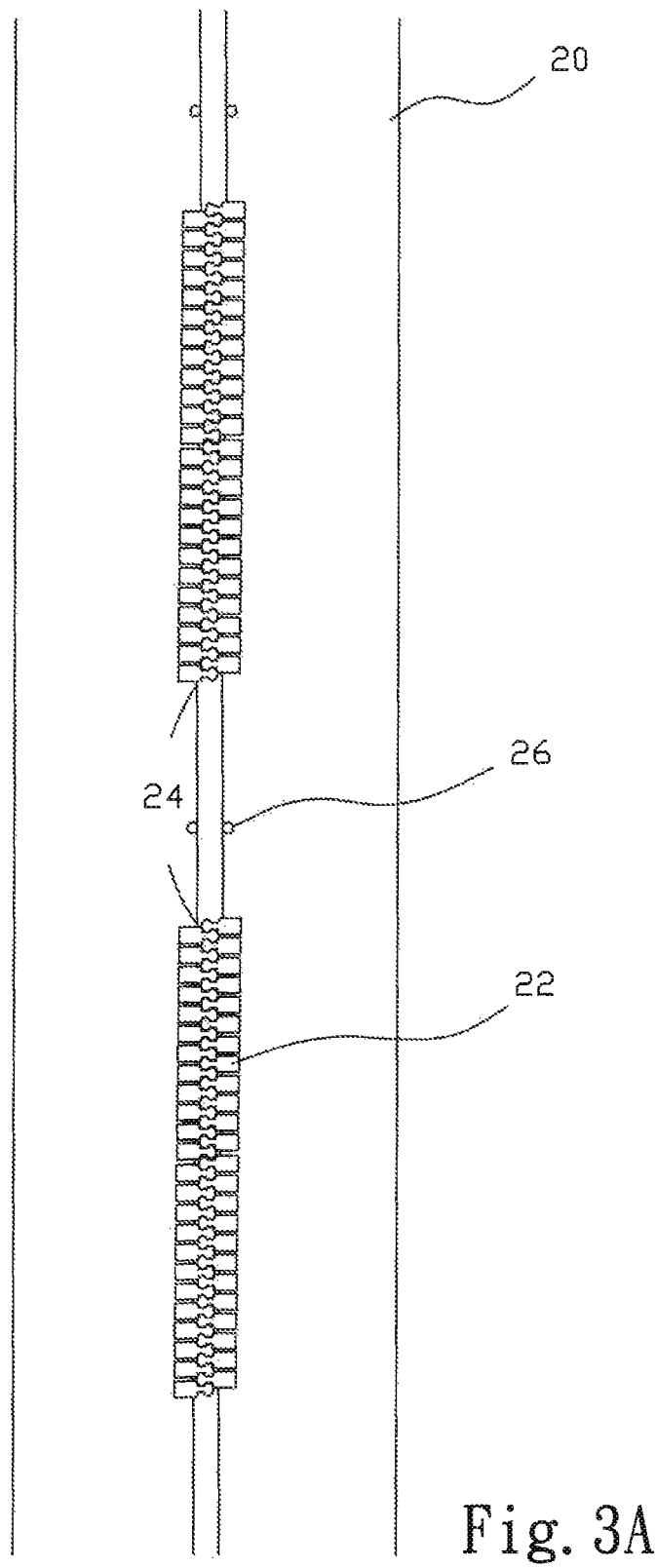
FIGS. 3A-3C are diagrams schematically showing the steps to fabricate semi-products of zippers according to one embodiment of the present invention.
Figure 3B:
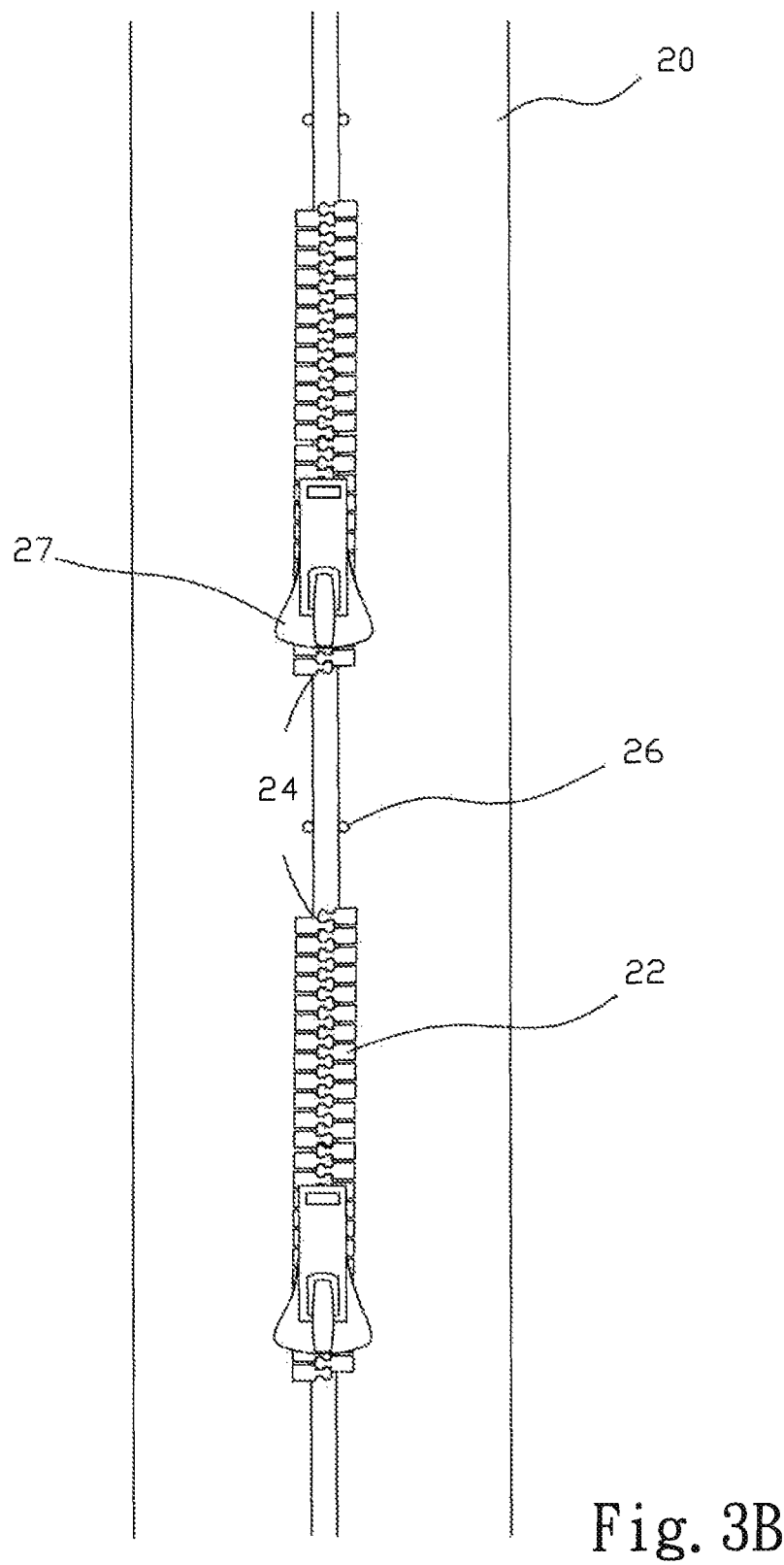
Figure 3C:
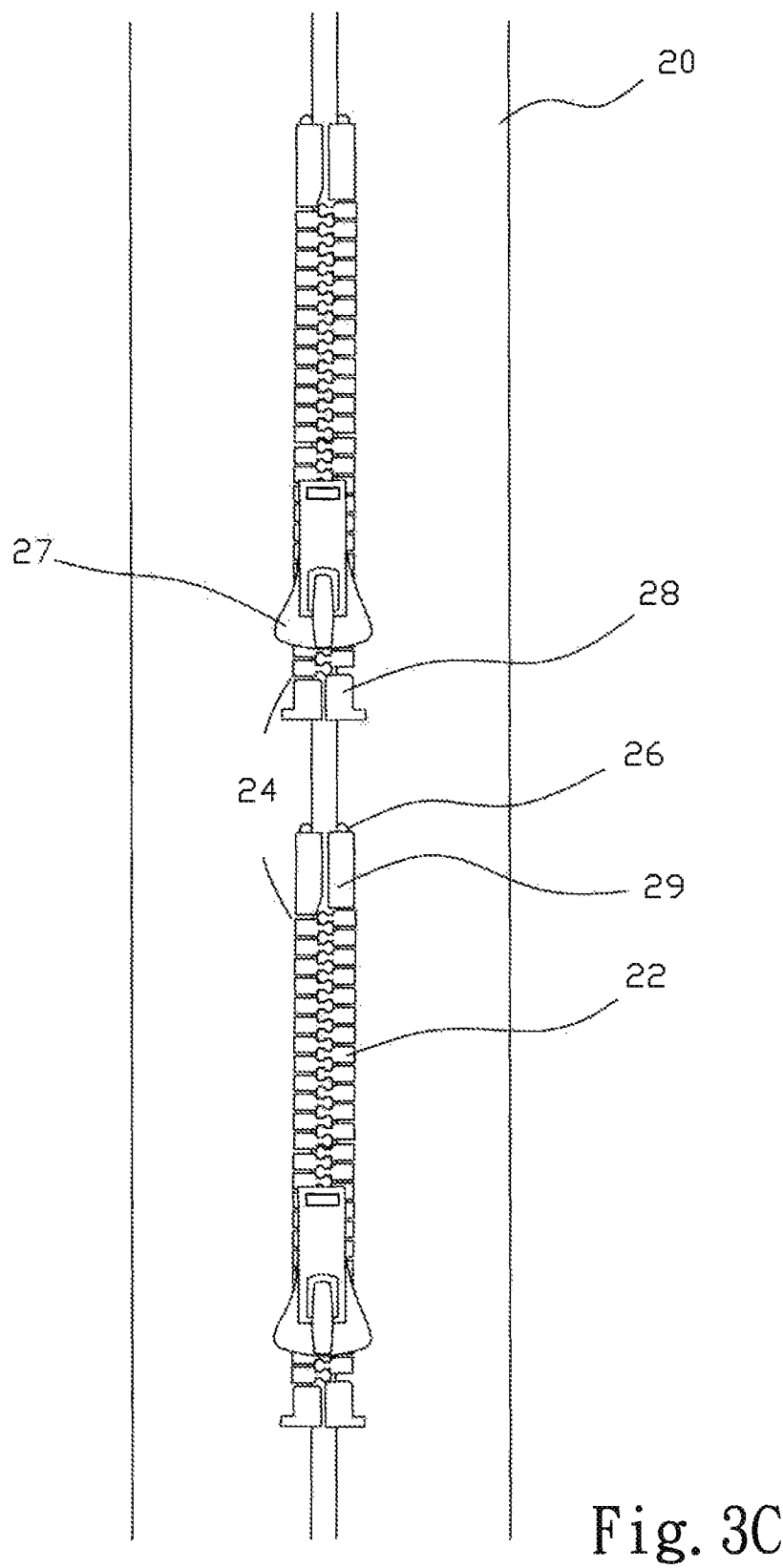
Figure 4:
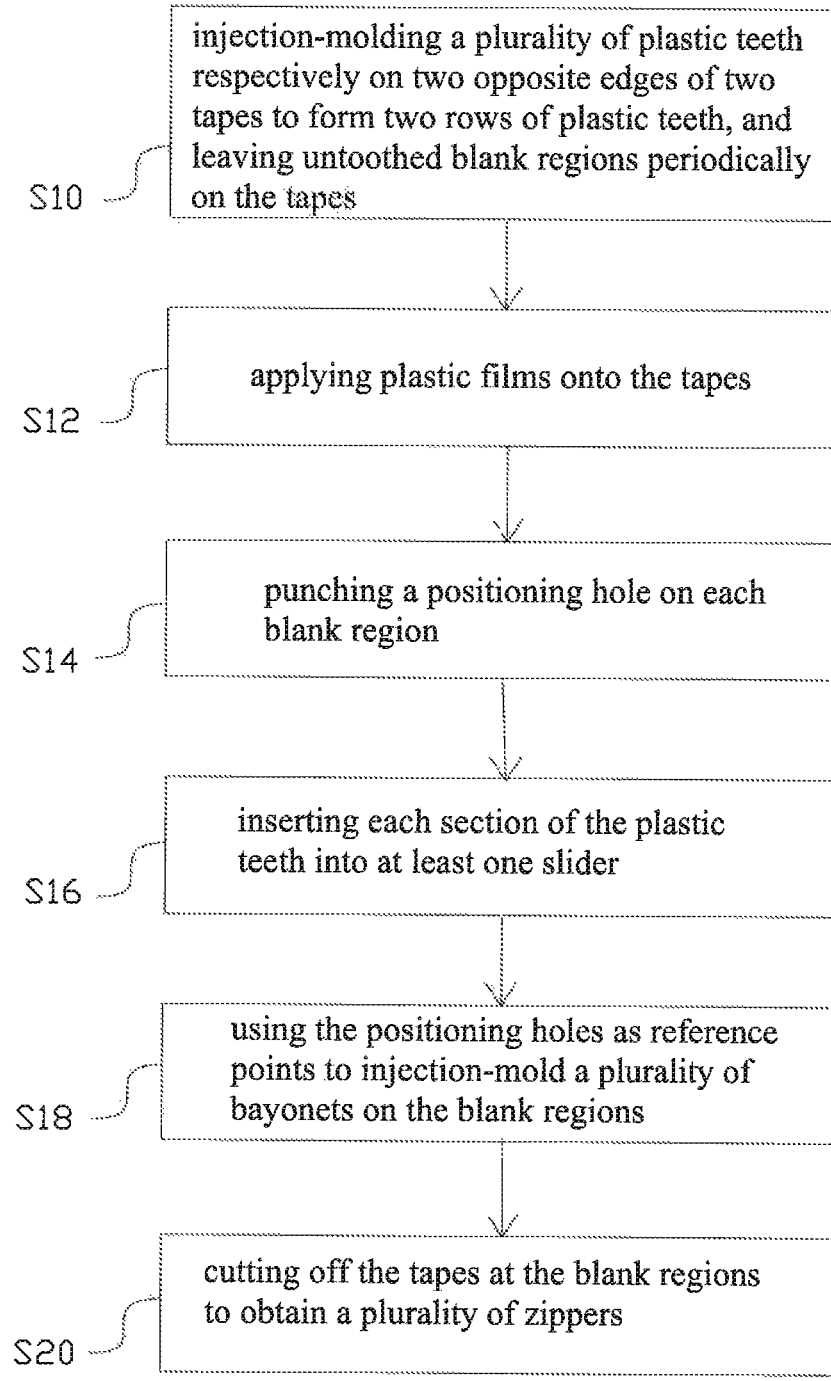
FIG. 4 is a flowchart of a method for automatically fabricating zippers according to one embodiment of the present invention.

Refer to FIGS. 3A-3C and FIG. 4 for a process of using the machine of the present invention to automatically fabricate zippers, wherein FIGS. 3A-3C are diagrams schematically showing the steps to fabricate semi-products of zippers according to one embodiment of the present invention, and wherein FIG. 4 is a flowchart of a method for automatically fabricating zippers according to one embodiment of the present invention.

FIG. 3A schematically shows the semi-product after completing Steps S10-S14. In Step S10, place two tapes 20 on the machine of the present invention, and use the tooth sizing device to injection-mold two rows of plastic teeth 22 respectively on two opposite edges of two tapes 20 with untoothed blank regions 24 left on the tapes 20 periodically. In Step S12, use the plastic film applying device to apply plastic films onto the tapes 20 to increase the durability of zippers. As the plastic films are transparent or semi-transparent and firmly stuck to the tapes 20, they are invisible in the drawings. In Step S14, use the punching device to punch a positioning hole 26 on each blank region 24 of the filmed tapes 20. The distance between the positioning hole 26 and the nearest plastic tooth 22 is four times the width of a plastic tooth 22, i.e. the length of an injection-molded bayonet. For example, the length of the lower stop bayonet is about four times the width of a plastic tooth 22.

In Step S16, use the tape inserting device to insert each section of plastic teeth 22, which is between two adjacent blank regions 24, into a slider 27, as shown in FIG. 3B. In Step S18, use the bayonet injection-molding device to injection-mold bayonets at the blank regions 24 with the positioning holes 26 being the reference points, as shown in FIG. 3C. The bayonets include upper stop bayonets 28 and lower stop bayonets 29, and each positioning hole 26 corresponds to a set of upper stop bayonet 28 and lower stop bayonet 29. The bayonet injection-molding device has two injection holes respectively used to injection-mold the upper stop bayonets 28 and the lower stop bayonets 29. Via setting the distance between the upper stop bayonets 28 and the lower stop bayonets 29 and setting the lower stop bayonets 29 in the area between the last plastic tooth 22 and the positioning hole 26, the bayonet injection-molding device can injection-molds the upper stop bayonets 28 and the lower stop bayonets 29 respectively on two ends of a section of plastic teeth 22. Then, use the automatic cutting device to cut off the tapes 20 at the residual blank regions 24, i.e. the region between positioning holes 26 and the upper stop bayonets 28, to obtain a plurality of zippers. In the abovementioned embodiment, the zipper has a single slider. In another embodiment, the zipper is a bidirectional one and has two sliders oriented oppositely.

In conclusion, the present invention proposes a method and machine for automatically fabricating zippers, wherein the conventional zipper fabrication procedures are improved, and wherein a machine is designed to automatically undertake all the improved zipper fabrication procedures, and wherein the present invention does not insert a plurality of cut tapes into sliders one by one but inserts the uncut tapes into all slides once for all, whereby zippers can be fabricated more easily and faster, and whereby the yield is promoted, and wherein the improved method of the present invention does not cut off the tapes before inserting tapes into the slider but cuts off the tapes after having inserted the tapes into the slider and having injection-molded the bayonets, and wherein the automatic machine of the present invention does not insert two tapes into the slide one after one but inserts two tapes into the slides simultaneously, whereby is decreased the manpower, increased the efficiency, and promoted the yield.

The embodiments described above are only to exemplify the present invention but not to limit the scope of the present invention. Any equivalent modification or variation according to the characteristic or spirit of the present invention is to be also included within the scope of the present invention.

What is claimed is:

1. A method for automatically fabricating zippers, which applies to a machine for automatically fabricating zippers and comprises steps:
   placing two tapes in parallel on said machine, injection-molding a plurality of plastic teeth on two opposite edges of said tapes, leaving untoothed blank regions on said tapes periodically, and applying plastic films onto said tapes;
   transporting said tapes having been filmed to a punching device to punch a positioning hole on each said blank region, wherein a distance between said positioning hole and a nearest said elastic tooth is about four times a width of said elastic tooth;
   transporting said tapes forward, inserting each section of said plastic teeth, which is between two adjacent said blank regions, into at least one slider, and injection-molding a plurality of bayonets on said blank regions respectively, wherein each said positioning hole corresponds to a set of bayonets; and
   cutting off said tapes at said blank regions to obtain a plurality of zippers.

2. The method for automatically fabricating zippers according to claim 1, wherein a tooth sizing device of said machine sets a distance between said plastic teeth and injection-molds said plastic teeth.

3. The method for automatically fabricating zippers according to claim 1, wherein a plastic film applying device of said machine applies said plastic films on said tapes.

4. The method for automatically fabricating zippers according to claim 1, wherein a tape inserting device of said machine inserts said tapes into said at least one slider.

5. The method for automatically fabricating zippers according to claim 4, wherein while said zippers are bidirectional zippers, each said zipper has two said sliders oriented oppositely.

6. The method for automatically fabricating zippers according to claim 1, wherein after said plastic teeth have been injection-molded, a positioning device moves said at least one slider to a specified position.

7. The method for automatically fabricating zippers according to claim 1, wherein said set of bayonets includes an upper stop bayonet and a lower stop bayonet.

8. The method for automatically fabricating zippers according to claim 1, wherein a bayonet injection-molding device of said machine injection-molds said bayonets on said tapes.

9. The method for automatically fabricating zippers according to claim 1, wherein an automatic cutting device of said machine cuts off said tapes.

* * * * *